Patented May 21, 1946

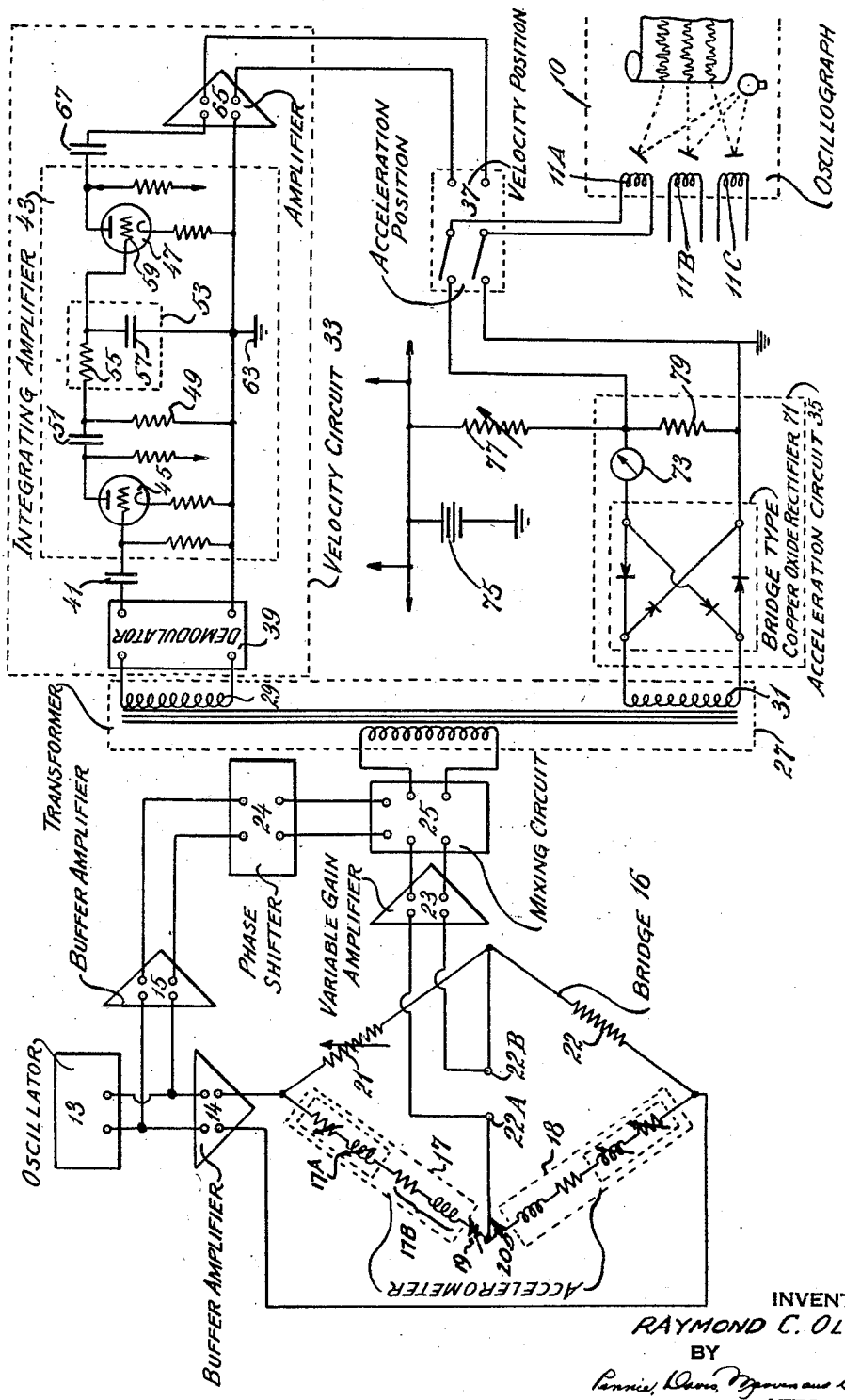

2,400,571

UNITED STATES PATENT OFFICE 2,400,571

ELECTRICAL MEASUREMENT

Raymond C. Olesen, Altadena, Calif., assignor to Consolidated Engineering Corporation, Pasadena, Calif., a corporation of California Application February 26, 1943, Serial No. 477,321

4 Claims. (Cl. 177—351)

This invention is concerned with electrical measuring devices of the modulated carrier type adapted to determine displacement of a body, for example, the vibration of a body. It is useful in connection with seismometers, accelerometers, and other displacement determining devices of this type, and may be employed to determine static and dynamic displacement as well as functions of dynamic displacement, including accelerations and velocity.

In determining vibrations of mechanical systems, it is desirable to employ a separate vibration pickup at each point at which the vibration is to be detected and to connect each pickup through a separate reproducing channel at the output of which is a galvanometer of a multiple element oscillograph. Thus, the pickup may be connected to a Wheatstone bridge in a reproducing channel with an alternating current voltage applied across the input terminals of this bridge. The frequency of the voltage thus applied to the input terminals of the bridge should be high compared to the frequency of the vibrations which are to be measured and this frequency is referred to as the carrier frequency and the voltage of such a frequency as the carrier wave.

In general, vibrations or other displacements bring about variations in impedance of the pickup. These variations in impedance vary the output of the bridge and modulate a carrier wave introduced thereinto in accordance with the amplitude of the vibrations.

The carrier, after modulation by the vibrations, may be demodulated to produce a low frequency electrical wave. This is transmitted to a recording galvanometer after suitable amplification. Depending upon whether or not it is desired to determine the vibration acceleration, the vibration velocity, or the vibration displacement, the demodulated wave may be subjected prior to recording to single or double integration or other electrical treatments.

The amplitude of vibration may vary considerably during a recording period and the apparatus should always be operated in such fashion that the percentage modulation of the carrier is less than 100%. When recording some vibration characteristics, only the components of the vibration within a limited frequency band, say 3 to 50 cycles, may be of interest. With certain other characteristics, the components of the vibration acceleration or displacement at all frequencies below a given level, say 50 cycles, and including zero frequency, may require investigation.

The two foregoing methods of operation produce different zero or rest points for the galvanometer. When the lowest frequency components, including those of zero frequency, are being recorded, a direct current representing the steady level of the carrier corresponding to no modulation will appear at the output of the demodulator. But this direct current will not be present when only frequencies in the limited band are being investigated. Naturally enough, this difference in zero points involves difficulty when the same oscillograph is employed for the two types of recording. The difficulty is greater when a multiple channel system is utilized together with a multiple element oscillograph having a single recording medium, and in this case, shifts in the zero position of the various traces may cause some of the traces to swing off the recording paper or at least may cause an alteration in the sequence of the traces on the paper.

In accordance with my invention, the zero or rest point of the galvanometer may be made the same for both types of recordings, so that vibration acceleration, vibration velocity, and vibration displacement may be recorded with a single oscillograph. This is accomplished by introducing an automatic compensation for the D. C. current which represents the steady level of the carrier corresponding to no modulation.

In summary, my invention contemplates in an electrical measuring device of the modulated carrier type adapted to determine displacement of a body, the combination which comprises a carrier wave source, a pickup responsive to the displacement of the body, means for modulating the carrier wave with the pickup output, a galvanometer, two circuits having different frequency response characteristics but each including a demodulator and selectively connectible between the carrier wave source and the galvanometer, and means for transmitting to the galvanometer through only one of said circuits a direct current corresponding to the amplitude of but in opposition to the demodulated carrier wave.

As indicated above, the invention is particularly applicable where a plurality of vibration reproducing channels each associated with a modualting pickup is employed. In such case, each channel should contain two separate circuits selectively connectible between the pickup of that channel and the galvanometer, with one circuit including a demodulator, an integrating network, and means for removing any direct current component of the demodulating cycle of that channel prior to application to the galvanometer. The second circuit should likewise include a demodulator together with means applying to the galvanometer the output of that demodulator and means should be provided for applying to the galvanometer a current equal and opposite to the direct current component when the galvanometer is connected to the second circuit, and for reducing this current to zero when the galvanometer is connected to the first circuit.

In short, in order to prevent a shift of the galvanometer zero level when changing from a recording of components including those of zero frequency to a recording excluding components of zero frequency, I provide means for supplying different amounts of direct current to the galvanometer at the time of the two recordings, this direct current being sufficient to compensate for the difference in zero level that might otherwise occur. Preferably during one recording, the direct current supplied to the galvanometer is zero, it being the difference that is important.

As will be apparent from the detailed description given hereafter, it is desirable to provide means in the channel for bucking out the direct current component to provide the same zero level in the galvanometer for the two types of recordings.

These and other aspects of my invention will be more thoroughly understood in the light of the following detailed description.

One form of vibration recording apparatus contemplated by my invention is illustrated in the accompanying diagram.

Broadly the apparatus comprises a multiple element oscillograph 10 having a plurality of galvanometers 11A, 11B, 11C therein, to each of which is connected suitable apparatus for reproducing vibrations detected by a vibration or displacement pickup, the apparatus being so designed that the vibrations recorded may or may not include those due to slow motions, including those of zero frequency, at the choice of the operator.

One channel of the apparatus for recording either acceleration or velocity of vibrations detected by an accelerometer is shown in detail in the drawing connected to the galvanometer 11A, it being understood that the others may be connected similarly to corresponding channels.

This apparatus comprises an oscillator 13, the output of which is connected in parallel to two buffer amplifiers 14 and 15. The output of the buffer amplifier 14 is applied to the input terminals of a Wheatstone bridge 16. In one branch of the Wheatstone bridge there are connected two vibration detecting elements 17 and 18 of a variable reluctance accelerometer (pickup) such as that disclosed and claimed in the co-pending patent application Serial No. 477,320, filed February 26, 1943, by Harold W. Washburn and Edmund E. Hoskins. In such a pickup, each detecting element 17, 18, comprises a variable impedance in series with a constant impedance. For example, the detecting element 17 is composed of a variable impedance 17A in series with a constant impedance 17B, both being illustrated in the drawing as resistances in series with inductances. The pickup is so designed that a change in displacement being detected produces proportional changes both in the resistance and the inductance of the detecting element.

Resistors 19, 20 in series respectively with the detecting elements 17, 18 are used to equalize the Q's of the corresponding bridge arms when the accelerometer is in the vibration condition. The other branch of the Wheatstone bridge includes resistors 21, 22 which may be used for initially balancing the bridge when no vibration is affecting the accelerometer, the resistor 21 being adjustable. When the accelerometer is subjected to vibrations, the impedances of the two detecting elements 17, 18 vary and thereby vary the electrical output signal appearing at the output terminals 22A, 22B of the bridge in a corresponding amount. This output, which is in the form of a modulated wave with a suppressed carrier, is applied to a variable gain amplifier 23.

The output of the buffer amplifier 15 is passed through a phase shifter 24 and applied together with the output of the variable gain amplifier 23 in the same or opposite phase to the input of a mixing circuit 25 as more fully explained in my co-pending patent application Serial No. 477,322.

When the carrier wave injected into the mixer from the amplifier is in the same or opposite phase with the bridge output signal applied to the mixer, the signal appearing at the output of the mixing circuit is modulated in proportion to the unbalance of the bridge resulting from the acceleration and hence in proportion to the acceleration. The output of mixing circuit is applied to a transformer 27 having a first secondary 29 which supplies modulated carrier to a circuit 33 for measuring velocity and a second secondary 31 supplies modulated carrier to a circuit 35 adapted to measure accelerations.

The galvanometer 11A corresponding to this channel may be connected to either of these circuits 33, 35 through a two pole double-throw switch 37.

In the velocity measuring circuit the modulated carrier is applied to a demodulator 39 at the output of which only components of a low frequency current (having components of the same frequency as the vibration being detected, and proportional amplitudes). This current is applied through a coupling and blocking condenser 41 to an integrating amplifier 43. This integrating amplifier comprises a first amplifier tube 45 and a second amplifier tube 47. The output of the first amplifier tube 45 appears across a resistor 49 which is connected to the anode of said first amplifier tube through a coupling and blocking condenser 51. The signal appearing across the resistor 49 is applied to an integrating network 53 (comprising a resistance 55 and a condenser 57), the resistor being connected between the blocking condenser 55 and a grid 59 of the second amplifier tube and the condenser 57 being connected between ground 63 and the grid 59.

With this network, the integrals of any signals above a predetermined frequency determined, say 3 cycles per second, which appear across the resistor 49 are applied to the grid 59 of the second amplifier tube 47. The output of this tube is transmitted to an amplifier 65 through a coupling and blocking condenser 67. The output of the amplifier is applied to the galvanometer 11A.

Except for the fact that the integrator is imperfect at frequencies below 3 cycles per second and the condensers 41, 51, and 67 filter out (from the demodulated wave) frequency components of very low frequency including those of zero frequency, the current applied to the galvanometer 11A from "velocity circuit" 33 is a reproduction of the velocity of the accelerometer case from 3 cycles per second up to an upper frequency limit, say about 50 cycles per second, this upper frequency limit being determined by the characteristic of the accelerometer. In consequence, an accurate reproduction of the vibration velocity occurs only over a limited frequency range extending from a lower limit of say 3 cycles per second to the upper limit of 50 cycles per second.

To consider the rest of the apparatus, when the double throw switch 37 is set to record acceleration including components of zero frequency, or just above, the signal appearing across the secondary 31 is applied to a bridge-type copper oxide rectifier 71, the output of which passes through a carrier amplitude indicating current meter 73 and thence to the galvanometer 11A. In this case, when no vibration is being received, a current corresponding to the steady or average carrier output of the mixing circuit appears at the output of the bridge rectifier. To prevent the galvanometer from now being displaced from the zero position it has when recording velocity, because of the presence of this current, an opposing current is supplied to the galvanometer.

In the present instance, this opposing current is provided by a grounded power supply battery 75 through a large variable resistor 77. The battery also supplies direct current to the anodes of the amplifier tubes in elements 14, 15, 23, 43.

A resistance 79, small compared to the large variable resistor 77 but large compared to the resistance of the galvanometer 11A is permanently connected between the output terminals of circuit 35 which lead to the galvanometer 11 when switch 37 is connected in the acceleration position. The resistance 79 is connected to ground and so is across the power supply 75.

The resistance 77 prevents flow of excessive currents from the battery 75 through the rectifier circuit 71 when the switch 37 is connected in the velocity position.

The manner in which battery 75 and resistor 77 perform the foregoing functions may readily be apparent by considering that resistor 79 and the galvanometer element 11A are in parallel and connect directly across the output of the bridge rectifier and also directly across the series-arranged battery 75 and resistor 77. Thus, both the rectifier and the battery 75 tend to send current through resistor 79 and galvanometer 11A. By reason of opposing polarities, battery 75 tends to send its current through the galvanometer element in the direction opposite from the current which the rectifier tends to send through it. By proper adjustment of the values of battery 75 and resistor 77 relative to the rectifier voltage, a balance can be made so that the tendencies of the rectifier and of the battery to send their currents through the galvanometer are exactly neutralized so that the galvanometer current is zero. Even though the current through resistor 79 and galvanometer 11A are made zero, the battery 75 nevertheless sends a current in series through resistor 77 and the bridge rectifier. The presence of resistor 77 in series with battery 75 thus tends to prevent such current from the battery through the rectifier from becoming excessive.

The term "acceleration component of zero frequency" is employed here to mean a unidirectional acceleration, while acceleration components of a frequency different from zero represent oscillatory accelerations. Such oscillatory accelerations may be of such low frequency that to assure recording them accurately, it is advisable to record acceleration components as low as zero frequency.

In the apparatus illustrated, the individual accelerometer and oscillator circuit is employed. However, when utilizing a series of pickups, it is desirable to employ a common oscillator, a common phase shifter, and a common buffer amplifier feeding the phase shifter. However, in such a multiple system, each pickup should be provided with an individual bridge, with an individual buffer amplifier 14 connected to the input of the bridge, and with individual amplifiers, mixers, transformers, etc., on the output of the bridge. Thus, each channel would employ individual acceleration circuits and velocity circuits, individual switches 37, and individual resistances 77 and 79.

Although the invention has been described hereinbefore as applied to a two channel circuit, it is equally useful in a one channel circuit, for example a channel adapted to measure acceleration or strain. Thus, the circuit may be employed in connection with either an accelerometer or a strain gauge. In both of these cases an unbalanced carrier wave will produce a displacement of the zero position of the galvanometer, and in both cases the impression of the bucking direct current will restore the galvanometer to the zero position.

The use of the bucking D. C. in the foregoing type of system obviates the necessity of mechanically changing the zero position of the galvanometer when changing from use with a strain gauge or accelerometer to some other type of pickup or circuit which does not cause a displacement of the zero position.

I claim:
1. An electrical measuring system comprising a carrier frequency bridge having four bridge arms, at least one of which comprises a variable impedance pickup, a pair of input terminals and a conjugate pair of output terminals for said bridge, a source of carrier frequency connected to said input terminals and a variable gain amplifier connected to said output terminals, a mixer, and means for connecting the output of said amplifier to said mixer, a source of carrier frequency connected to said mixer to produce a modulated carrier output from said mixer, a galvanometer, and a channel including a demodulator connected between the mixer and the galvanometer.

2. An electrical measuring system comprising a carrier frequency bridge with four bridge arms, a pair of opposite input terminals and a conjugate pair of opposite output terminals for said bridge, a source of carrier frequency connected to said input terminals, one of said bridge arms having a variable impedance pickup adapted to respond to displacement and thereby superimpose a modulation frequency on said carrier frequency in the bridge, said bridge being balanced for said carrier frequency so that it produces no output of said carrier frequency, but does produce an output of said modulation frequency, a mixer connected to the output of said bridge, and a source of carrier frequency connected with said mixer so that the output of said mixer contains modulated carrier frequency.

3. An electrical measuring system comprising a carrier frequency bridge with four bridge arms, a pair of opposite input terminals and a conjugate pair of opposite output terminals for said bridge, a source of carrier frequency connected to said input terminals, said bridge being balanced with respect to said carrier frequency so that said carrier frequency is suppressed at the output terminals, a variable impedance pickup adapted to respond to vibratory displacements connected with said bridge, whereby said bridge produces a modulation frequency in response to said displacement which appears at said output terminals, a mixer having applied to it a fixed carrier frequency of constant amplitude and means for connecting said output terminals to said mixer, a demodulator connected to the output of said mixer to detect said modulation frequency, a galvanometer responsive to said demodulator, and means for impressing across the galvanometer a D. C. voltage equal but opposite to the average uni-directional voltage impressed on the galvanometer by the demodulation.

4. An electrical measuring system comprising a carrier frequency bridge with four bridge arms, a pair of opposite input terminals and a conjugate pair of opposite output terminals for said bridge, a source of carrier frequency connected to said input terminals, said bridge being balanced with respect to said carrier frequency so that said carrier frequency is suppressed at the output terminals, a variable impedance pickup adapted to respond to vibratory displacements connected with said bridge, whereby said bridge produces a modulation frequency in response to said displacement which appears at said output terminals, a mixer having applied to it a fixed carrier frequency of constant amplitude and means for connecting said output terminals to said mixer, a plurality of channels upon which the output of said mixer is impressed, each of said channels having a demodulator, a galvanometer responsive to the output of said demodulator, and means for transmitting to the galvanometer through only one of said channels a direct current component of voltage corresponding to average amplitude of the demodulated carrier, and a compensating D. C. voltage for opposing said voltage at the galvanometer.

RAYMOND C. OLESEN.